(12) United States Patent
Siddiqui

(10) Patent No.: US 8,163,049 B2
(45) Date of Patent: Apr. 24, 2012

(54) FLUORIDE-MODIFIED SILICA SOLS FOR CHEMICAL MECHANICAL PLANARIZATION

(75) Inventor: Junaid Ahmed Siddiqui, Richmond, VA (US)

(73) Assignee: DuPont Air Products Nanomaterials LLC, Tempe, AZ (US)

( * ) Notice: Subject to any disclaimer, the term of this patent is extended or adjusted under 35 U.S.C. 154(b) by 1259 days.

(21) Appl. No.: 11/783,191

(22) Filed: Apr. 6, 2007

(65) Prior Publication Data

US 2007/0251156 A1 Nov. 1, 2007

Related U.S. Application Data

(60) Provisional application No. 60/792,629, filed on Apr. 18, 2006.

(51) Int. Cl.
*B24D 3/02* (2006.01)
*C09C 1/68* (2006.01)
*C09K 3/14* (2006.01)

(52) U.S. Cl. ............... 51/307; 51/308; 51/309
(58) Field of Classification Search ............... 51/307, 51/308, 309
See application file for complete search history.

(56) References Cited

U.S. PATENT DOCUMENTS

| | | | | |
|---|---|---|---|---|
| 2,022,893 | A * | 12/1935 | Martin | 51/299 |
| 2,110,630 | A * | 3/1938 | Martin | 51/300 |
| 2,352,246 | A * | 6/1944 | Benner et al. | 51/309 |
| 2,422,153 | A * | 6/1947 | Var Nimwegen et al. | 51/298 |
| 2,901,337 | A * | 8/1959 | Keutgen et al. | 51/298 |
| 3,252,917 | A | 5/1966 | Mindick | |
| 3,620,978 | A | 11/1971 | Moore, Jr. | |
| 3,745,126 | A | 7/1973 | Moore, Jr. | |
| 5,009,674 | A * | 4/1991 | Kunz et al. | 51/295 |
| 5,110,321 | A * | 5/1992 | Broberg et al. | 51/295 |
| 5,888,258 | A * | 3/1999 | Kaaber | 51/307 |
| 5,993,686 | A | 11/1999 | Streinz et al. | |
| 6,056,794 | A * | 5/2000 | Stoetzel et al. | 51/295 |
| 6,121,143 | A * | 9/2000 | Messner et al. | 51/295 |
| 6,454,821 | B1 * | 9/2002 | Abbasi et al. | 51/309 |
| 6,471,735 | B1 | 10/2002 | Misra et al. | |
| 6,743,267 | B2 | 6/2004 | Jernakoff et al. | |
| 6,893,476 | B2 * | 5/2005 | Siddiqui et al. | 51/307 |
| 7,022,255 | B2 * | 4/2006 | Siddiqui et al. | 252/79.1 |

(Continued)

FOREIGN PATENT DOCUMENTS

EP 1000995 5/2000

OTHER PUBLICATIONS

"Integration of Chemical-Mechanical Polishing into CMOS Integrated Circuit Manufacturing" by Landis et al., Thin • Solid Films vol. 220, Nos. 1-2, Nov. 20, 1992.

(Continued)

*Primary Examiner* — Jerry Lorengo
*Assistant Examiner* — Ross J Christie
(74) *Attorney, Agent, or Firm* — Christopher Hayden; John R. Dodd; Geoffrey L. Chase

(57) ABSTRACT

A chemical-mechanical planarization composition containing surface-modified abrasive particles such as silica where at least a portion of the surface of the particles has bound thereto a surface-modifying aluminum-containing stabilizer and fluoride that is used to polish semiconductor substrates. The use of a CMP slurry containing surface-modifying aluminum-containing stabilizer and fluoride bound to a silica abrasive provides high metal polishing rates relative to the removal rate of a dielectric.

19 Claims, 2 Drawing Sheets

U.S. PATENT DOCUMENTS

| | | | |
|---|---|---|---|
| 7,153,335 B2* | 12/2006 | Siddiqui et al. | 51/307 |
| 2003/0162398 A1 | 8/2003 | Small et al. | |
| 2004/0006924 A1 | 1/2004 | Scott et al. | |
| 2004/0029495 A1 | 2/2004 | Small et al. | |
| 2004/0107650 A1* | 6/2004 | Siddiqui et al. | 51/307 |
| 2004/0144038 A1 | 7/2004 | Siddiqui | |
| 2004/0154229 A1* | 8/2004 | Ito et al. | 51/307 |
| 2005/0044803 A1* | 3/2005 | Siddiqui et al. | 51/307 |
| 2005/0076578 A1* | 4/2005 | Siddiqui et al. | 51/307 |
| 2005/0079718 A1* | 4/2005 | Siddiqui et al. | 438/692 |
| 2005/0155296 A1 | 7/2005 | Siddiqui | |
| 2006/0117667 A1* | 6/2006 | Siddiqui et al. | 51/309 |
| 2006/0270235 A1* | 11/2006 | Siddiqui et al. | 438/692 |

OTHER PUBLICATIONS

"Chemical-Mechanical Polish", by Gregory Shinn et al., Handbook of Semiconductor Manufacturing Technology, p. 415-460, Oct. 2000.

"Polishing Surfaces for Integrated Circuits" by Mueller et al., Chemtech, Feb. 1998, p. 38-46.

The Chemistry of Silica, Ralph K. Iler, Wiley-Interscience Publications, pp. 410-413, Aug. 1979.

* cited by examiner

FLUORIDE-MODIFIED SILICA SOLS FOR CHEMICAL MECHANICAL PLANARIZATION

RELATED APPLICATIONS

This application claims priority to U.S. Provisional Application Ser. No. 60/792,629 titled "Fluoride-Modified Silica Sols for Chemical Mechanical Planarization" filed on Apr. 18, 2006.

BACKGROUND OF THE INVENTION

1. Field of the Invention

In some embodiments, the present invention pertains to surface-modified colloidal abrasive polishing compositions and associated methods of using these compositions, particularly for chemical mechanical planarization (CMP), wherein the slurry comprises a fluoride-surface-modified colloidal abrasive. More particularly, in some embodiments, the invention relates to an improved composition and process for the chemical mechanical polishing or planarization of semiconductor wafers tailored to meet more stringent requirements of advanced integrated circuit fabrication. In some embodiments, the present invention particularly relates to compositions for polishing substrates comprising at least one dielectric material using a chemical-mechanical polishing system comprising surface-modified colloidal silica and in particular a fluoride-surface-modified colloidal silica.

2. Description of the Related Art

CMP for planarization of semiconductor substrates is now widely known to those skilled in the art and has been described in numerous patents and open literature publications. Some introductory references on CMP are as follows: "Polishing Surfaces for Integrated Circuits", by B. L. Mueller and J. S. Steckenrider, Chemtech, February, 1998, pp. 38-46; H. Landis et al., Thin Solids Films, 220 (1992), page 1; and "Chemical-Mechanical Polish" by G. B. Shinn et al., Chapter 15, pages 415-460, in Handbook of Semiconductor Manufacturing Technology, editors: Y. Nishi and R. Doering, Marcel Dekker, New York City (2000).

In a typical CMP process, a substrate (e.g., a wafer) is placed in contact with a moving polishing pad, for example, a rotating polishing pad attached to a platen. A CMP slurry, typically an abrasive and chemically reactive mixture, is supplied to the pad during CMP processing of the substrate. Typically, metal CMP slurries contain an abrasive material, such as silica or alumina, suspended in an oxidizing, aqueous medium. The abrasive may alternatively be partially or fully bound to the polishing pad. During the CMP process, the pad (typically fixed to the platen) and substrate are moved, typically by rotating both, while a wafer carrier system or polishing head applies pressure (downward force) against the substrate. The slurry or polishing liquid in combination with an abrasive polishing pad accomplishes the planarization (polishing) process by chemically and mechanically interacting with the substrate film being planarized due to the effect of the movement of the pad relative to the substrate. Polishing is continued in this manner until the desired film on the substrate is removed with the usual objective being to effectively planarize the substrate.

Silicon based semiconductor devices, such as integrated circuits (ICs), typically include a dielectric layer. Multilevel circuit traces, typically formed from aluminum or an aluminum alloy or copper, are patterned onto the dielectric layer substrate. There are numerous types of layers that can be polished by CMP, for example, silicon nitride, interlayer dielectrics (ILD) such as silicon oxide and low-k films including carbon-doped oxides; metal layers such as tungsten, copper, aluminum, etc., which are used to connect the active devices; and barrier layer materials such as titanium, titanium nitride, tantalum, tantalum nitride, noble metals, etc.

CMP processing is often employed in semiconductor manufacturing to remove excess metal at different stages. Various metals and metal alloys have been used at different stages of semiconductor manufacturing, including tungsten, aluminum, copper, tantalum, tantalum nitride, titanium, titanium nitride, ruthenium, platinum, iridium, and combinations thereof. For example, one way to fabricate a multilevel copper interconnect or planar copper circuit traces on a dielectric substrate is referred to as the damascene process.

Surface modification of the abrasive is known. Colloidal silica, for example, has been modified with various metallic compounds as disclosed in U.S. Pat. Nos. 3,252,917, 3,620,978 and 3,745,126; U.S. patent applications Nos. 2003/0162398, 2004/0006924, 2004/0029495, and 2005/0155296; EP Patent Publication 1 000 995; and also in the book entitled "The Chemistry of Silica", R. K. Iler, Wiley Interscience (1979), pages 410-411. Abrasives such as silica, ceria, and titania have been surface-modified with boron-containing compounds such as boric acid, as disclosed in co-owned U.S. Pat. No. 6,743,267, the disclosure of which is incorporated by reference herein. Other patents of interest include U.S. Pat. No. 3,620,978 issued to DuPont; U.S. Pat. No. 5,993,686 issued to Cabot Corporation; U.S. Pat. No. 6,471,735 issued to Air Liquide America Corporation; and U.S. Patent Publication No. 2004/0144038 to DuPont Air Products Nanomaterials.

During the fabrication of integrated circuit (IC) devices, polishing slurries for chemical mechanical planarization of tungsten must meet several criteria such as: high tungsten removal rates, minimal erosion of dielectric layers, high tungsten-to-dielectric layer removal rate selectivity, low tungsten to titanium selectivity, low tungsten static etch rates, and low contamination from catalysts, which in the prior art are typically multivalent soluble cations such as iron salts and fluoride sources such as hydrogen fluoride, ammonium fluoride, and other fluoride salts.

For CMP application, in the prior art, water soluble fluoride salts such as potassium fluoride and ammonium fluoride are commonly used as catalysts to increase the removal rates of inert metals such as tungsten, titanium, platinum, nickel, and ruthenium. While the use of soluble fluoride compounds increases the speed at which periodic acid or hydrogen peroxide reacts with tungsten and titanium nitride, they also require CMP slurries with large concentrations of dissolved, ionic components. As a result, the polished substrates can become contaminated by the adsorption of charged species from the soluble compounds such as hydrofluoric acid or ammonium fluoride. These species can migrate and change the electrical properties of the IC chip, for example at gates and contacts, and change the effective dielectric properties of dielectric layers. These changes may reduce the reliability of the integrated circuits with time.

During chemical mechanical planarization of tungsten, the dielectric layer (for example, PETEOS) chemically reacts with the slurry particles under acidic or basic conditions. As a result of this chemical reaction, erosion of the dielectric layer occurs, which leads to non-planarization and a loss in IC device yield. Therefore, it is desirable to design slurries that minimize the dielectric loss while maintaining high tungsten removal rates during chemical mechanical planarization. The dielectric layer loss can be prevented with additives in the slurry that protect the oxide layer without affecting the tungsten removal rates during polishing. A slurry composition that can produce a combination of high tungsten removal rates and low dielectric layer removal rates without introducing "catalyst" contamination, for example iron ions and/or fluoride ions that are absorbed onto the surface of the substrate, is highly desirable for use during IC device fabrication. The tungsten-to-dielectric layer selectivity requirements depends upon individual IC design rules. However, a slurry composition that can be tuned for tungsten-to-dielectric layer removal rate selectivity with a change in the concentration of components can be versatile in adopting to multiple design rules during tungsten polishing step. Non-aggressive slurry compositions with low static etch rate, high tungsten removal rates, and low dielectric layer removal rates are highly desirable for IC device fabrication.

Typically, slurries employing soluble fluoride ions are too aggressive and attack metal indiscriminately, which increases tungsten static etch rate; this leads to dishing of metal lines and recess of tungsten plugs. During and after the polishing step in the tungsten CMP process, soluble fluoride ions adsorb onto the dielectric layer surface, which causes defects. In some embodiments, the invention described herein allows the use of aluminum fluoride modified silica in the polishing slurries; this novel approach allows high tungsten and titanium removal rates followed by an easy removal of fluoride containing abrasive during cleaning step.

All references cited herein are incorporated by reference herein in their entireties.

BRIEF SUMMARY OF THE INVENTION

In some embodiments, the invention describes a uniquely simple method for the preparation of fluoride-modified silica, and more particularly aluminum fluoride modified colloidal silica, and use of aluminum fluoride modified silica for CMP application. Advantageously, in some embodiments, the abrasive material of this invention has been surface-modified by a stabilizer, in particular a stabilizer that comprises Al, for example an aluminum salt or an aluminate stabilizer, and that has then subsequently undergone further surface modification with fluoride. In some embodiments, the invention also relates to chemical mechanical polishing slurries and chemical mechanical polishing of substrates, particularly of substrates comprising a material (such as tungsten) where fluoride is known to accelerate the polishing rate and where at least a portion of the abrasive material has fluoride ions bound thereto via an intermediary, preferably a stabilizer, for example an intermediary comprising an aluminum atom. In some embodiments, the invention also relates to chemical mechanical polishing slurries where most of the fluoride in the slurry available to contact the substrate to be polished is bound, preferably via a covalent bond, to the aluminum salt or aluminate that is in turn coated onto and that modifies at least a portion of the surface of the abrasive, which is preferably silica. Instead of using soluble fluoride salts, which can indiscriminately attack wafer surface, a novel method was developed for delivering fluoride ions heterogeneously during CMP process via aluminum fluoride modified colloidal silica particles.

This results in numerous advantages. Surprisingly, very large increases in tungsten polishing rates are observed with very small amounts of bound fluoride, while the dielectric polishing rate is unchanged, each rate being compared to polishing with a polishing composition comprising the same composition (except for the fluoride) and at the same conditions. Also, bound fluoride provides the benefit of fluoride ions (e.g., an increase in the tungsten removal rate) without the indiscriminate attack of the various exposed layers of a semiconductor substrate that fluoride ions in solution exhibit. As most of the fluoride ions are attached to the abrasive surface, fluoride ions can be readily removed with the abrasive during the cleaning step.

BRIEF DESCRIPTION OF THE DRAWINGS

In order to facilitate a fuller understanding of the present disclosure, reference is now made to the accompanying drawings. These drawings should not be construed as limiting the present disclosure but are intended to be exemplary only.

DETAILED DESCRIPTION OF THE INVENTION

Figure 1:
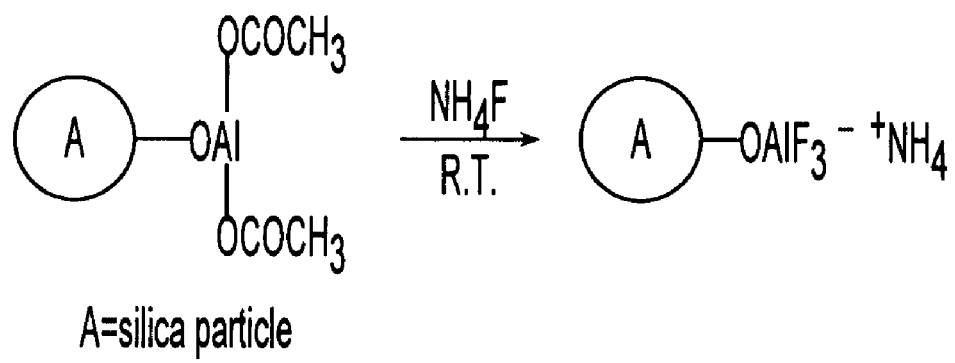
FIG. 1 is a schematic diagram showing reaction of ammonium fluoride with aluminum acetate modified silica to produce aluminum fluoride modified silica.

As used herein, when fluoride is discussed, such means active fluoride ions, that is, fluoride that contributes to polishing rate, presumably by interaction with the substrate. Fluoride ions in organic polymers, for example NAFION™, are believed to be bound to the polymer and can act as a chelator, but do not contribute any appreciable amount of active fluoride to the CMP slurry.

Silica that is surface-modified by an aluminum salt or aluminate and then by a source of fluoride ions results in fluoride ions that are tightly bound to the particle, by what is believed to be (without being bound to theory) a covalent bond. The covalent bond results in strong retention of fluoride on the abrasive, which in turn greatly simplifies both removing the fluoride from the polished substrate and also preventing the fluoride from attacking and/or contaminating certain portions of the substrate, particularly dielectric portions of the substrate. Also, the layer of fluoride is a monolayer or less on the available surface area of the abrasive, so the amount of bound fluoride is readily controlled.

Advantageously, the abrasive is silica and at least a portion of the available surface area of the silica is modified by an aluminum salt, for example, aluminum acetate, where acetate stabilizes the aluminum-containing stabilizer during preparation of the particle but is eventually a leaving group, as then at least a portion of the acetate is replaced by fluoride ions. It is recognized that this substitution reaction is driven by equilibrium, but evidence suggests that with a protonated leaving group such as acetate attached to the aluminum atom the substitution of acetate by fluoride is fairly quick and complete. With other less active leaving groups, the amount of fluoride that must be added to the slurry to achieve fluoride substitution onto the aluminum may be excessive, resulting in excess soluble fluoride unless, for example, washing and filtering steps are subsequently performed to reduce the amount of excess soluble fluoride.

Various embodiments of this invention allow for a small concentration of fluoride ions to additionally be in the aqueous carrier phase of the CMP slurry. As a practical matter, every composition having fluoride-modified abrasive suspended therein must have some fluoride ions. Advantageously, at least one tenth, preferably at least one quarter, preferably, for example, at least one half of the total active fluoride ions in a CMP slurry is fluoride bound to the abrasive particles. Fluoride bound to the silica-surface-modifying-aluminum-containing abrasive appears to very effective, compared to soluble fluoride, possibly because the abrasive particle forces the fluoride into very close proximity to the substrate surface. Preferably most of the fluoride in the polishing composition is bound onto the aluminum-containing stabilizer, for example, via a covalent bond directly to the aluminum-containing stabilizer. Most preferably greater than 75% of the active fluoride is bound to the abrasive particles. As a practical matter, this will usually be the case if there is two or fewer fluoride ions added per atom of aluminum having two leaving groups such as acetate attached to the abrasive.

As previously mentioned, advantageously, the abrasive particle is treated so that an aluminum atom is bound to the abrasive before introduction of the fluoride ions. The preferred stabilizer comprises an aluminum ion that is bound (directly or through oxygen atoms) to silicon atoms in a silica substrate. Generally, the abrasive, for example colloidal silica, must be rigorously de-ionized prior to contacting with the aluminum stabilizer salt to obtain adequate and quantitative bonding of aluminum stabilizer salt to the abrasive. It is possible that at least one fluoride atom can be attached to an aluminum stabilizer salt ion prior to binding the aluminum stabilizer salt to the abrasive, but this is not a preferred method of manufacture. Fluoride ions when bound to aluminum quickly reduce the solubility of the resultant product.

When it is stated that the fluoride is bound to the aluminum, it is believed, without being bound by theory, that the fluoride binds directly to the aluminum atom. It is recognized, however, that for at least a portion of the added fluoride this may not be the case. The aluminum-containing stabilizer is typically added as an at least partially soluble salt, which are advantageously aluminum salts having protonated leaving groups. Any weak organic acid salt will work as a leaving group, and aluminum acetate is preferred because of its availability and reactivity. Experiments always included boric acid—another known stabilizer that can bind to silica, much like aluminate or aluminum acetate. It is known that adding boric acid (or salt thereof) to deionized silica will result in borate ions being bound to the silica, much as the aluminum-containing stabilizer is bound to silica. Further, it is known that other atoms that promote polishing, for example ferric/ferrous ions and cuprous/cupric ions, which can react with peroxide to form hydroxyl radicals which promote polishing, can be added to borate/boric acid-stabilized silica such as is described in co-owned U.S. application Ser. No. 10/759,666. Generally, even aluminum acetate does not on its own have sufficient solubility to enable a sufficient amount be added in a reasonably short period of time such that complete coverage of the silica is attained, and some acid is usually added to increase the solubility of the aluminum salt. Water-soluble formulations of aluminum acetate that are commercially available in a boric acid-stabilized forms $(CH_3CO_2)Al(OH)_2 \cdot X\ H_3BO_3$ and $(CH_3CO_2)_2Al(OH) \cdot X\ H_3BO_3$, which are preferred in some embodiments of this invention. Boric acid stabilized aluminum acetate is preferred because it is water soluble. Therefore, it is recognized that upon the addition of the boric-acid-stabilized aluminum acetate a portion of the unmodified silica surfaces will be modified by the aluminum salt or aluminate, a portion of the unmodified silica surfaces will be modified by boric acid or borate, and possibly some sites on the surface of the silica may be modified by both borate and by aluminum salt. It may well be that the boric acid/borate itself is bound to the silica, and the aluminum salt/aluminate is subsequently bound to the silica. Alternatively, both boric acid (borate) and aluminum salt/aluminate may be separately bound to the silica. Generally, when in describing the silica surface as being modified by aluminum salt/aluminate, this means boric acid may additionally modify some of the silica surface, that the aluminum salt/aluminate may be bound to borate which is itself bound to the silica, that the aluminum salt/aluminate may be directly bound to silica with no borate, or any combination of the foregoing.

Adding the aluminum salt with the boric acid is done for convenience, and the invention will work as well and possibly be even more effective at polishing if the aluminum acetate is added without boric acid/borate being added, as it is not believed that the boron-containing stabilizer is very effective at binding fluoride since the boron-containing stabilizer competes with the aluminum-containing stabilizer for available surface sites.

As previously stated, the aluminate or aluminum-containing stabilizer comprises organic leaving groups, and preferred leaving groups are low molecular weight organic acid anion moieties such as formate, acetate, propionate, and the like. Generally, an aluminum-containing stabilizer can have up to three such leaving groups, but for many embodiments where it is either desirable to additionally incorporate borate as a stabilizer or if borate stabilizer is not an impediment to subsequent use, then it is preferred that the number of such leaving groups is one or/two. Additionally, the low pH resulting from the addition of boric acid may make the acetate group more available to replacement by the fluoride ion. A tris-form of the aluminum salt is also usable provided it is stable. A useful aluminum acetate can have three acetates per aluminum, and such Al $CH_3CO_3$ material is sufficiently soluble in water. Optionally, boric acid can be added to this aluminum-containing stabilizer. A preferred and commercially available boric acid stabilized aluminum acetate (di-basic aluminum acetate) has only one acetate group (Al $CH_3CO_2\ (OH)_2 * \frac{1}{3}H_3BO_3$). Basic aluminum acetate can have two acetate groups, for example Bis(acetato-O) Hydroxy-Aluminum (CAS 142-03-0) has a chemical formula: Al $(C_2H_3O_2)_2OH$ or $Al_2O(C_2H_3O_2)_4 * H_2O$. When referring to moles of aluminum-containing stabilizer or aluminum salt or aluminate such means that the formula is written to contain a single aluminum atom. Typically, the boric acid stabilized aluminum di-acetate $(CH_3CO_2)_2Al(OH) \cdot X\ H_3BO_3$ has between 0.2 to about 1 mole boric acid per mole of aluminum acetate.

Other aluminum salts can be used, specifically including, for ease of use, the commercially available aluminum salts and basic aluminum salts of low molecular weight organic acid moieties such as formate, acetate, propionate, and other low molecular weight organic anions capable of acting as a leaving group and having between one and three such low molecular weight organic moieties per aluminum atom. Less preferably other alkoxyaluminum compounds such as aluminum acetylacetonate, aluminum formoacetate, and even methoxyaluminum, tris-acetoxyaluminum, tris-aluminum butyrate, tris-aluminum tolylfluoroacetylacetate, tris-aluminum ethylacetoacetate, aluminum diacetylacetonato-dipivaloylmethanate, aluminum diisopropoxy(ethylacetoacetate), and the like can be used as the aluminum-containing stabilizer. Aluminum acetate is preferred, however.

Generally, an aluminum salt stabilizer bound to the surface of a silica particle can bind with at most 3 fluoride atoms. Reviewing the structure of aluminum salts/aluminate suggests that two of the fluoride atoms would be tightly bound (e.g., by a strong bond such as a covalent bond), displacing an acetate or (less likely) a hydroxyl group or other potential leaving group, while the last fluoride added (in this case the third fluoride) may be ionically bound. Therefore, in a preferred embodiment, the total moles of active fluoride present in a slurry is less equal to or less than 8 times the moles of aluminum-containing stabilizer previously added to the slurry. Preferably the total moles of active fluoride present in a slurry is equal to or less than 5 times, for example less than 4 times, and most preferably between 0.01 and 3 times, the moles of aluminum-containing stabilizer added to the slurry. Generally, activity of the added fluoride is best if the total moles of active fluoride present in a slurry is between about 0.3 to about 3 times, for example from 0.5 to about 2 times the moles of aluminum-containing stabilizer added to the slurry. The activity of the bound stabilizer (e.g., aluminum salt or aluminate) having fluoride thereon will depend on the number of fluoride ions bound to the aluminum-containing stabilizer, as well as the absolute amount of aluminum-containing stabilizer bound to the abrasive surface. Activity is expected even if there is less than 1 mole of bound fluoride per mole of bound aluminum-containing stabilizer, but it is preferred that there be at least 1 mole, for example at least 1.5 moles of fluoride per mole of bound aluminum-containing stabilizer.

The absolute amount of aluminum-containing stabilizer bound to the surface of the abrasive in a slurry is not unlimited. Basically, the amount of effective stabilizer (be it aluminum-containing stabilizer or the total amount of aluminum-containing stabilizer and borate stabilizer) can not effectively exceed the amount of stabilizer needed for full surface coverage of the abrasive material, where the amount required for full surface coverage is the amount where further addition of stabilizer results in no change in the zeta potential of the particles caused by the binding of stabilizer thereon (as estimated from a titration graph of amount of stabilizer added versus the zeta potential of the suspended particles). It is believed that boric acid will compete with the aluminum-containing stabilizer for active sites on the abrasive surface. Therefore, the relative amounts of boric acid and aluminum salts, e.g., aluminum acetate, added to deionized silica affects the total amount of aluminum-containing stabilizer available for binding with fluoride. The mole ratio of aluminum-containing stabilizer to boric acid added to the deionized silica (while still providing sufficient aluminum-fluoride-surface-modified silica abrasive to observe an increase in the tungsten polishing rate) can range from infinite (no boric acid present) to about 1:20, but is preferably between about 20:1 to about 1:5, for example from about 6:1 to about 1:2. Again, boron stabilizer is not believed to be particularly effective in binding active fluoride, but it is useful in stabilizing the particle (preventing agglomeration of abrasive particles) and is also a useful material for adding other useful polishing adjuvants such as iron.

The slurry and more particularly the particles in the slurry can contain iron ions, copper ions, or both in a form that may increase the reactivity of available per-type oxidizers. The most basic embodiment of this invention is a slurry that comprises an abrasive and an abrasive-surface-modifying material that comprises a stabilizer (preferably aluminum) and fluoride. In various embodiments, the slurry may further comprise one or more of: 1) abrasive particles having no stabilizer/fluoride, 2) abrasive particles that have abrasive-surface-modifying-activator (preferably iron) thereon, 3) abrasive particles that have abrasive-surface-modifying-stabilizer (preferably borate) and activator (preferably iron) thereon, and/or 4) abrasive particles that have both an abrasive-surface-modifying material that comprises a stabilizer (preferably aluminum) and fluoride as well as a surface-modifying-stabilizer (preferably borate) and activator (preferably iron) thereon. However, one advantage of the current invention is to allow polishing of, for example, tungsten at high rates without using activator iron or soluble iron, as the presence of an activator iron bound to silica results in minor but still troublesome iron contamination of the substrate, and the presence of soluble iron ions results in high levels of iron contamination of the substrate. Advantageously, in some iron-free embodiments, there is less than 10 ppm, less than 1 ppm, or preferably substantially zero (less than 0.1 ppm) of total iron present in the slurry.

For particles having both iron and fluoride attached thereto, advantageously, the fluoride is added before the addition of the iron. For slurries having soluble fluoride, advantageously, the particles having iron activator bound thereto have the activator iron bound directly to the silica, as opposed to subsequently reported improvements where a stabilizer is bound to silica and iron is then bound to the stabilizer. There appears to be a difference in the way ferric acetate coated silica and boron-iron coated silica react with ammonium fluoride. That is, reaction of ammonium fluoride with ferric acetate coated silica does not deactivate or strip off iron from the ferric acetate coated silica. This was confirmed using ICPMS data. This is possibly due to the covalent bond of the ferric acetate coated silica. For particles having both iron and fluoride attached thereto, advantageously, the fluoride is added to and bound to the stabilizer before the addition of the iron. Interestingly, ferric ions were stripped off and/or deactivated when ammonium fluoride was contacted with Boron-O—Fe coated silica. The difference may reflect the ionic nature of B—O—Fe bond. White residue (which may be a ferric fluoride compound) was collected when ammonium fluoride was added to B—O—Fe coated silica, with the resulting product exhibiting lower tungsten removal rates than a slurry having had no fluoride added thereto. The displacement of ion suggests that fluoride may at least partially bind to borate stabilizers. While not tested in the laboratory, it is possible that deionized silica can be reacted with a boric acid/aluminum acetate stabilizer as described in the Examples, then reacted with fluoride as described in the Examples, and then further reacted with a source of iron, wherein said iron bound to said stabilizer would be effective to catalyze the formation of hydroxyl radicals when used in a slurry with a per-type oxidizer.

The aluminate or aluminum-containing stabilizer should be added to the abrasive (e.g., silica) particles before the fluoride is added. It is not believed that aluminum tri-fluoride can be directly added to silica abrasive particles. There is no direct surface reaction between aluminum fluoride and colloidal silica because aluminum fluoride ($AlF_3$) has a melting point of about 1290° C. and aluminum fluoride is insoluble in water. It is not believed to be practical to try to add aluminum bi-fluoride or aluminum mono-fluoride to silica particles. While in theory alumina may be added to silica if there is only one fluoride ion attached, the solubility of the reagent will be low.

The stabilizer advantageously comprises aluminum-containing component. The stabilizer may further comprise a boric acid-type stabilizer component. Other stabilizers are also useful, including a phosphoric acid-type stabilizer component and a tungstate stabilizer component. While at least a trace of fluoride might or might not be added to any one or more of the a boric acid-type stabilizer, phosphoric acid-type stabilizer, or tungstate stabilizer, such fluoride is not expected to show the efficacy in improving polishing rates as is shown by fluoride bound to aluminum-containing stabilizer. It is believed that it is most advantageous if fluoride is added to the aluminum-containing stabilizer.

In a preferred embodiment, it is believed that most of the aluminum-containing stabilizer (in the form of an a compound comprising aluminum, for example an aluminate or an aluminum salt of low molecular weight organic acids) is bound to the abrasive, e.g., silica, and most of the active fluoride in the polishing slurry is bound to the abrasive, e.g., silica. It is believed that the effective fluoride is bound to the aluminum, which in turn is bound to silica. But as aluminate or other suitable aluminum-containing stabilizers are added to the silica in soluble form, some aluminum in the slurry will not be bound to silica. Such material is expected to immediately bind with fluoride as the fluoride is added. There may be, however, some residual aluminate in solution, for example, in the form of aluminum acetate but where one or two of the acetate groups have been displaced by fluoride. There may further be dispersed particles of aluminum fluoride and/or aluminum fluoride/acetate, where, if present, said particles would likely have a diameter below about 5 nanometers, because of the high insolubility of the product and because of the low concentration of reactants in solution during the manufacture of the slurry. The slurry may contain, therefore, residual atomic or nanometer-scale particles of aluminum fluoride that are not attached to silica. Such particles are not desired, as they can be difficult to remove from a substrate. Generally, provided the amount of stabilizer (be it an aluminum salt of a low molecular weight organic acid, an aluminate or aluminum salt stabilizer, or a aluminum salt of a low molecular weight organic acid/borate stabilizer) added to the slurry is less than about 100%, for example, equal to or less than about 98% of the amount needed for full surface coverage, where the amount required for full surface coverage is the amount where further addition of stabilizer results in no change in the zeta potential of the particles (as estimated from a titration graph of amount of stabilizer added versus the zeta potential of the suspended particles), then the amount of non-bound aluminum fluoride is believed to be minor and of little practical consequence.

The exact mechanism by which the bound fluoride contributes to the polishing performance of the slurry is not known. It may be that the binding of aluminum salt or aluminate to silica activates the bound fluoride in some manner. However, adding as little as 0.01 moles of fluoride to 6 grams of silica abrasive provides a large increase in the polishing rate of tungsten.

The proposed invention describes a simple method for the preparation of aluminum fluoride modified silica, by reacting ammonium fluoride or hydrofluoric acid or other source of fluoride with aluminum acetate modified silica. This chemical reaction, for an aluminum stabilizer having two organic acid anions, e.g., acetate, thereon is described in FIG. 1.

While the reaction shown in FIG. 1 above uses aluminum stabilizer having two acetates, the stabilizer may only comprise one acetate (or other leaving group, that is, an organic acid cation). In such a case, where in place of the second acetate (or other useful leaving group) there is for example —OH, then we believe no fluoride will be added at that spot, and therefore the maximum amount of bound fluoride that can be added to one mole of bound aluminum stabilizer having only one leaving group will be two moles.

Note that in FIG. 1 the third fluoride is attached ionically, forming a negative charge on the silica. Such ionically bound fluoride will only be present in an excess of fluoride, which is not preferred. This loose attraction is less preferred than the covalent bonds shown for the fluoride that replaced the acetate leaving group. That absorption or ionic bonding of fluoride ions to aluminum atoms may result in a further decline in the zeta potential of the silica. During replacement of acetate groups with fluoride, the decrease in the zeta potential is believed to result from the removal of positively charged acetate from the surface of the silica. Absorption by ionic bonds will be less quantitative, and on viewing a titration it is expected to be easy to identify regimes where fluoride replaces leaving groups as opposed to when fluoride attaches to aluminum because of the ionic attraction of fluoride to aluminum atoms.

Preferably the amount of active fluoride is about equal to, say between 50% and 150%, of the moles of aluminum-containing stabilizer present on the surface of the abrasive times the number of leaving groups present on the aluminum-containing stabilizer. The amount of aluminum-containing stabilizer can vary, for example, between 0.1 E-4 moles and 25 E-4 moles per gram of abrasive, e.g., silica, more typically 2 E-4 moles and 15 E-4 moles, for example between 6 E-4 moles and 10 E-4 moles of aluminum-containing stabilizer per gram of abrasive. The fluoride even in trace amounts readily displaces acetate leaving groups. For surface-bound aluminum stabilizer salts having less active leaving groups, a higher concentrations of fluoride may be necessary to quantitatively place fluoride onto the aluminum-containing stabilizer, resulting in excess soluble fluoride in the liquid portion of the silica slurry. The reaction between fluoride bound to a silica surface and the aqueous fluoride is believed to be by the following pathway shown in FIG. 2.

Figure 2:
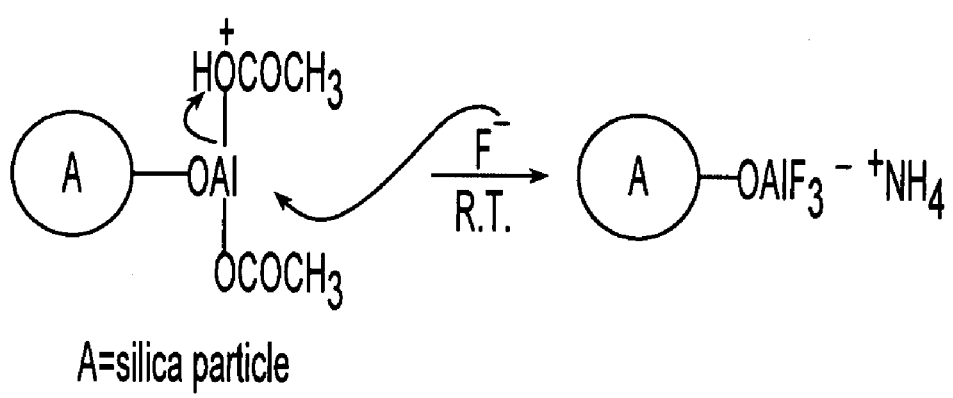
FIG. 2 is a schematic diagram showing the mechanism of reaction between ammonium fluoride and aluminum acetate modified silica.

In FIG. 2, a simple SN2 reaction of the aluminum acetate modified silica can be represented in a general form: In its simplest form where before adding fluoride x is 2, then $(silica)\text{-}OAl(F)_x(Ac)_y$, where Ac is acetate group or other leaving group, so for any given aluminate or aluminum atom x can be 0, 1, 2, or 3, and y can be 0, 1, or 2, wherein if x is 2 y can only be 0 or 1, and if x is 3 y must be zero. Of course, other ions or hydroxyls can also replace the acetate groups or other leaving groups. Addition of fluoride is best accomplished in a deionized media, e.g., containing less than 100 ppm, preferably less than 50 ppm, chloride. The ratio of x to y will depend upon the number of leaving groups initially present and on the concentration of ammonium fluoride. And of course, on a silica particle or on the many silica particles in a slurry, there will be atoms of each combination of x and y present, but on this larger scale x should be between 0.1 and 3, preferably between 0.5 and 2.5, for example between 0.9 and 2, and y can be from 0 to 2, preferably from 0 to 1.5, for example from 0.1 to 1. Maximum allowed fluoride atom on aluminum is 3 which will form the form negative $—O—AlF_3^-$. This is expected as $AlF_4^-$ salts are well known.

Other methods of placing aluminum acetate onto silica can be used. Other aluminum salts having useful leaving groups can be utilized to form the Al-containing stabilizer.

When using aluminum acetate (or other aluminum salt of low molecular weight organic acids) as the stabilizing salt, there is a simple method of monitoring the reaction involving monitoring the zeta potential of the silica. Aluminum acetate modified silica is positively charged because under acidic pH, protonation of acetate group on the surface takes place. We believe this phenomenon may also make the acetate a good leaving group. As the acetates are displaced by fluoride, the silica becomes progressively less positively charged and eventually can become negatively charged. The zeta potential will change accordingly.

The amount of surface-modification of the colloidal abrasive with stabilizer depends upon the amount of stabilizer (mass of stabilizer to mass of coated abrasive) present and on the average size of the colloidal abrasive particles. Colloidal abrasive particles that are smaller and which consequently have less surface area generally require higher relative amounts of stabilizer than do larger particles, which have more surface area, to be effectively stabilized (forming a stable slurry or dispersion). The surface coverage of the surface modified abrasive can be characterized using zeta potential measurement. During the preparation of aluminum acetate modified silica, aluminum acetate is added to the deionized silica particles, which changes the zeta potential of the silica particle surface. For example, the relative amount of surface coverage of aluminum acetate on the silica surface can be measured by adding the aluminum acetate in a titration and by monitoring the zeta potential of the silica abrasive, for example using a Colloidal Dynamics instrument, manufactured by Colloidal Dynamics Corporation, 11-Knight Street, Building E8, Warwick, RI. 02886. The Colloidal Dynamics instrument measures the zeta potential (surface charge) of the surface modified silica particles. It is relatively straightforward to measure the zeta potential of colloidal silica before addition of stabilizer. It is likewise a straightforward measurement to determine the zeta potential of silica particles that are completely covered with aluminum-containing stabilizer (where there is excess aluminum salts present). After reaching the full surface coverage, there is no change in the zeta potential of the surface modified silica with continued addition of stabilized aluminum acetate. From this titration curve of zeta potential as a function of grams of aluminum acetate to a given amount of silica, it is possible to extrapolate back and determine the amount of aluminum acetate which corresponds to 100% surface coverage. To determine the percent surface coverage of aluminum acetate on the silica surface, the amount of stabilizer needed to reach 100% surface coverage is determined. When this amount is added to the specified amount of silica, the silica is presumed to have 100% surface coverage. But if only 80% of the amount of aluminum acetate needed to attain 100% coverage is added, the surface coverage is deemed to be 80%. If only 50% of the amount of aluminum acetate needed to attain 100% coverage is added, the surface coverage is deemed to be 50%. It is preferred that at least 1%, typically at least 20%, more preferably 40-95% or 80-99% of available surface sites on the abrasive are coated with the aluminum-containing stabilizer such as an aluminate or aluminum acetate, the boron-containing stabilizer such as a borate, or both. The percentage of surface sites covered on an abrasive in a composition of this invention can range up to 100%.

After completing the reaction with aluminum acetate, the surface coverage achieved by reacting the aluminum acetate-modified sol with a source of fluoride, e.g., ammonium fluoride, can also be determined in the same manner via titration while monitoring the zeta potential. At least 1%, typically at least 20%, more preferably 40-95% or 80-99% of available aluminum-containing stabilizer surface sites on the abrasive are subsequently reacted with fluoride. Alternatively, of the aluminum-containing stabilizer that is bound to silica, preferably at least 20%, more preferably at least 50% are advantageously further modified by the addition of fluoride. A particle may have between 90% to 99% or more of surface sites occupied by aluminum fluoride. The amount of fluoride can vary from less than 1 and 3 fluoride atoms per aluminum-stabilizer atom.

The fluid phase of the polishing slurry is preferably aqueous and more preferably deionized water. The fluid phase will typically comprise an oxidizer. Generally, the slurry comprises primarily water and has therein 1) between 0.1% and 10% by weight, typically between 1% and 5% by weight, of per-type oxidizer, e.g., hydrogen peroxide, peracetic acid, or the like; and 2) between 0.1% and 12% by weight of abrasive which advantageously includes aluminum-fluoride-modified abrasive (e.g., silica), for example between 0.1% and 6% by weight, and typically between 0.5% and 3% by weight of aluminum fluoride modified abrasive.

Other well known polishing slurry additives may be incorporated alone or in combination into the CMP slurry of this invention. Inclusion of iron-ion-coated silica and/or copper-ion-coated silica, with or without a stabilizer intermediary, has already been discussed. A non-inclusive list of other agents includes agents to stabilize the oxidizer in the presence of the a metal complex (anti-oxidants); inorganic acids to modify pH; organic acids that can be useful as chelators; corrosion inhibitors including polyhydroxy aromatic compounds (such as catechol) and triazoles such as benzotriazole; other chelating agents including for example EDTA, DPTA, ATMP, HEDP, and the like; surfactants; alkyl ammonium salts or hydroxides; and dispersing agents. The slurry may comprise, for example, between 0.001 weight percent and about 0.5 weight percent each of any one or more of the above.

The pH of the compositions of this invention is not limited and can be chosen to be that corresponding to an acidic, a basic, or a neutral value. The pH of the composition is advantageously between about 2 and about 8.

The slurry may advantageously comprise between 0.001 weight percent and about 0.2 weight percent of one or more of phosphoric acid, phosphonic acid, polyphosphoric acids, pyrophosphoric acids, polyphosphonic acids, or metal-free salts thereof. Metal-free salts are preferably ammonium salts or substituted ammonium salts where each of the three hydrogen atoms can be independently hydrogen, —$CH_3$, $C_2H_5$, $C_3H_7$ including isopropyl, $C_4H_9$ including tert-butyl moieties, —$CH_2CH_2OH$, or —$CH_2OH$.

A preferred slurry comprises 0.5 weight percent to 3 weight percent, preferably 1 weight percent to 2 weight percent, of aluminum fluoride surface-modified colloidal silica; a minor amount, for example, between 0.001 weight percent and 0.1 weight percent, of an inorganic base, for example ammonium hydroxide; about 1 weight percent to about 8 weight percent, preferably between about 3 weight percent and about 5 weight percent, of periodic acid or hydrogen peroxide; and a balance water.

Advantageously, there is less than 0.01%, preferably less than 0.005%, for example, less than 0.002%, of soluble fluoride ions in the polishing slurry. Advantageously, prior to polishing, there is less than 100 ppm of soluble metal ions.

This invention provides compositions and methods that are particularly useful for CMP of metal-containing substrates, including tungsten-containing substrates, copper-containing substrates, titanium-containing substrates, titanium-nitride containing substrates, tantalum-containing substrates, tantalum-nitride containing substrates, and other substrates associated with integrated circuits, thin films, semiconductors, and wafers. The compositions and methods of this invention will be useful to polish any substrate where soluble (active) fluoride ions are useful, whether alone or with other oxidizers, chelators, organic acids, amino acids, metal ions, catalysts, corrosion inhibitors, and the like. Traditional CMP procedures can be utilized, including adhering some or all of the abrasive material onto the polishing pad. Advantageously, for abrasive on a pad, the pad is periodically reconditioned to replenish the fluoride, and if necessary the aluminate, coatings on the silica abrasives.

The associated methods of this invention comprise the use of the aforementioned compositions for polishing the aforementioned substrates. Typically, a substrate (e.g., a wafer) is placed face-down on a polishing pad that is fixedly attached to a rotatable table of a polisher. In this manner, the substrate to be polished is placed in direct contact with the polishing pad.

A wafer carrier system or polishing head is used to hold the substrate in place and to apply a downward pressure against the backside of the substrate during CMP processing while the table and the pad are rotated. The polishing composition (e.g., CMP slurry) is applied (usually continuously) on the pad during CMP processing to effect the removal of material to (at least partially) planarize the substrate.

Advantageously, if used to polish tungsten, the tungsten removal rate is greater than 300 Å/min, typically greater than 1500 Å/min, preferably greater than 3000 Å/min, and is in commercial embodiments typically between 4000 and 7000 Å/min. As is known in the art, the removal rate can be varied by a number of factors, including the concentration of oxidizers, concentration of abrasives, polishing pressure and speed (RPM), slurry flow rate, size of abrasive particles, and the concentration of catalysts, polishing enhancers, and the like. The composition and associated methods of this invention are particularly useful and preferred for tungsten CMP and afford tune-able selectivities for removal of tungsten in relation to dielectric (as illustrated in the examples).

The compositions and methods of this invention are particularly useful in reducing unwanted corrosion or attack by soluble fluoride ions of the various materials, including metals, barrier materials such as metal nitrides, dielectric materials including low-K materials, polysilicon, and the like existing on the substrate. For corrosion, corrosion can be general, and corrosion can also take place in areas where two or more dis-similar materials are in intimate contact, such as where a tantalum nitride and tungsten layers meet. One advantage of having polishing accelerators such as fluoride on the silica is that the corrosion between layers can be greatly reduced, as the silica abrasives do not readily contact the area where the dis-similar metals meet, while the removal rate of the metal layers is not unduly restricted. The use of the materials of this invention also reduce non-corrosive attack of substrates. One particularly important example is the attack of fluoride ions onto the dielectric material, including low-k dielectric materials, where fluoride (which may be bound to the substrate) changes the substrate (dielectric) properties. Again, as fluoride in the instant invention is bound to the silica abrasive, said fluoride is not available to bind to the dielectric material nor to migrate into porous dielectric material, so such damage is minimized or even eliminated.

In one important embodiment, the aluminum-fluoride-modified silica of the present invention is used with iron- or copper-modified abrasives, preferably iron-modified silica, copper-modified silica, borate-iron modified silica, borate-copper modified silica, aluminate-iron modified silica, aluminate-copper modified silica, tungstate-iron modified silica, tungstate-copper modified silica, phosphorous (phosphate)-iron modified silica, phosphorous-copper modified silica, or any combination thereof. As described in a number of pending applications and issued patents, such iron or copper when bound to the surface of an abrasive (preferably silica) with a stabilizer (aluminate, borate, phosphate, or the like) optionally placed between the silica and the iron and/or copper, greatly increases the polishing efficacy of per-type oxidizers, which is believed to be due to the formation of hydroxyl radicals via a Fenton's Reaction-type mechanism.

The present invention is further demonstrated, but is not intended to be limited, by the examples below. All percentages are weight percentages and all temperatures are degrees Celsius unless otherwise indicated.

EXAMPLES

The polishing slurries used in these examples included A) water, B) aluminum-containing stabilizer/ammonium fluoride modified silica, and C) other co-additives with in the polishing compositions. A list of additives used in the polishing formulations is summarized below:

Boric acid/aluminum acetate -modified colloidal silica (based on SYTON® HT50 colloidal silica with average particle diameter of 40 to 55 nanometers): available from DuPont Air Products NanoMaterials L.L.C., 2507 West Erie Drive, Tempe, Ariz. 85282.

Periodic acid: available from Sigma-Aldrich, P.O. Box 355, Milwaukee, Wis. 53201.

SURFYNOL® 104—This commercial product is 2,4,7,9-tetramethyl-5-decyn-4,7-diol: available from Air Products and Chemicals, Inc., Allentown, Pa. 18194 (added as Surfynol® 104E, a 50:50 mixture of 2,4,7,9-tetramethyl-5-decyn-4,7-diol in ethylene glycol for ease of handling during the preparation of CMP slurry formulations).

The substrates tested included PETEOS, a Plasma enhanced deposition of tetraethoxy silane dielectric oxide layer and blanket wafers having typically one type of surface (tantalum nitride, or tungsten, or the like) prepared for polishing experiments.

The following are definitions and parameters used in the testing:
Å: angstrom(s)—a unit of length
CMP: chemical mechanical planarization, or chemical mechanical polishing
min: minute(s)
ml: milliliter(s)
mV: millivolt(s)
psi: pounds per square inch
rpm: revolution(s) per minute
W:PETEOS Sel means the Tungsten:PETEOS Selectivity—the ratio of the amount of tungsten removed from a blanket wafer to the amount of PETEOS removed from a blanket wafer during CMP experiments under identical conditions.
W:TOx Sel means the Tungsten:Thermal Oxide Selectivity—the ratio of the amount of tungsten removed from a blanket wafer to the amount of Thermal Oxide removed from a blanket wafer during CMP experiments under identical conditions.
PETEOS: plasma-enhanced tetraethoxysilane
TEOS: tetraethoxysilane Zeta potential measurements were made using a Colloidal Dynamics instrument, manufactured by Colloidal Dynamics Corporation, 11-Knight Street, Building E8, Warwick, RI. 02886. This instrument measures the zeta potential (surface charge) of colloidal particles, such as surface-modified colloidal silica particles.

Surface coverage of aluminum acetate-surface modified silica and aluminum fluoride modified colloidal silica was measured in the following manner. During the preparation of aluminum acetate-surface-modified colloidal silica, de-ionized silica was added to aluminum acetate. The colloidal silica used for the preparation of deionized silica was SYTON® HT50, which has a negative zeta potential of −75 to −85 mV. The addition of aluminum acetate changed the zeta potential of the deionized colloidal silica particle surface from a value near zero (−5 mV to +4 mV, depending upon pH) to +32 mV. After reaching the full surface coverage, there was no further change in the zeta potential of aluminum acetate surface modified silica.

The reaction of ammonium fluoride with aluminum acetate modified silica was also monitored using the COLLODIAL DYNAMICS® instrument. As the reaction between ammonium fluoride proceeded with aluminum acetate modified silica, zeta potential changed from a positive zeta potential value to a negative zeta potential.

Example 1

There are numerous steps to this Example. The first is the preparation of boric acid/aluminum acetate surface modified silica. This example describes the preparation of aluminum acetate surface modified colloidal silica starting with colloidal silica particles, SYTON® HT50, having an average particle diameter of 40 to 55 nanometers.

Approximately 3.907 kg of AMBERLITE IR-120 ion exchange resin (Rohm and Haas Company, Philadelphia, Pa.) was washed with 1 liter of 20% sulfuric acid solution. The mixture was stirred and the resin was allowed to settle. The aqueous layer was decanted and washed with 10 liters of deionized water. The mixture was again allowed to settle and then the aqueous layer was decanted. This procedure was repeated until the decanted water was colorless. This procedure afforded an active acidic form of ion exchange resin.

SYTON® HT50, 22.687 kg, (50 wt % solids: 11.34 grams silica, 11.34 grams water), DuPont Air Products NanoMaterials, LLC, 2507, W. Erie Drive, Ariz.) was placed in a 10-gallon mix tank equipped with an agitator. To this SYTON® HT50, an additional 10.663 kg of deionized water was added to the tank and the solution was allowed to mix for 10 minutes. The pH of the solution was measured to be approximately 10.2. With continued pH monitoring, small amounts of the acidic form of ion exchange resin were added, while allowing the pH to stabilize in between additions. Aliquots of resin were added in small portions until the pH had dropped to pH 1.90-2.20. Once this pH limit had been reached and was stable in this range, no further resin additions were made and the mixture was stirred for 1-1.5 hours. Subsequently, the mixture was passed through a 500-mesh screen to remove the resin and afforded 11.34 kg of deionized and diluted SYTON® HT50 in 22.00 kg of deionized water.

In a separate 15-gallon tank, equipped with an agitator, 10.507 kg of de-ionized water was added. To this water, 1.284 kg of boric acid stabilized aluminum acetate powder (Fisher Scientific, 2000 Park Lane, Pittsburgh, Pa., 15275) was added slowly under agitation. This non-hydrated water-soluble boric acid-stabilized aluminum acetate has the formula $CH_3CO_2$ Al $(OH)_2 \cdot 1/3$ $H_3BO_3$ and a combined formula weight of 140.2 comprising about 85.6% basic aluminum acetate (aluminum mono-acetate dihydroxide) and 14.4% boric acid. After completing the addition of the boric acid stabilized aluminum acetate powder, the mixture was agitated for additional 10 minutes to produce boric acid stabilized aluminum acetate solution. Previous experience, for example, as described in U.S. Pat. No. 7,022,255, suggested this amount of stabilizer would provide nearly 100% (at least greater than 80%) coverage of the available surface sites on the available silica.

Therefore, a total of 1099 grams (9.16 moles) of aluminum mono-acetate dihydroxide and 185 grams (2.99 moles) of boric acid are available to react with the 11.34 kg of deionized and diluted SYTON® HT50. The deionized and diluted SYTON® HT50 (33.32 kg) prepared was then added to the boric acid stabilized aluminum acetate solution, slowly over about 1.2 hours at room temperature. This amount of stabilizer (8.1*E-4 moles aluminum acetate and 2.6*E-4 moles boric acid per gram of silica) will provide approximately 100% coverage of the available surface sites on the silica. After this addition was complete, the resulting dispersion was subsequently filtered through a 1-micron filter to afford what was expected to be aluminum mono-acetate surface modified colloidal silica in water with a total weight of about 44.11 kg. During the bonding of the aluminum mono-acetate to the silica we expect a water molecule may be lost, so the total weight of the solids may only have been 12.45 kg instead of the 12.6 kg otherwise expected. The moles of stabilizer are not expected to change, so there are 9.16 moles of aluminum mono-acetate and 2.99 moles of boric acid coated as stabilizers on 11.34 kg of silica, or 8.1 E-4 moles of aluminum mono-acetate and 2.6 E-4 moles of boric acid coated as stabilizers on each gram of silica.

This 12.45 kg of aluminum mono-acetate surface modified colloidal silica in 31.66 kg of substantially deionized water was characterized for colloidal stability over 15 days using ACCUSTOSIZER® instrument. The slurry having ~28% solids was found to be stable (not settle), and to exhibit both constant pH (pH approximately, 4.9 to 5.3) and zeta potential (zeta potential approximately +35 mV). Zeta potential changes with the amount of abrasive particles present—at 2.0 weight percent solids, the zeta potential increases to +83 mV. The percentage of surface sites of this surface-modified colloidal silica occupied by aluminum acetate containing compound(s) was approximately 98%.

The second step in Example 1 is the preparation of Boric Acid/Aluminum Fluoride modified silica from the reaction between aluminum acetate modified silica and ammonium fluoride. In a preliminary step it is advisable to add the fluoride slowly to a small aliquot of the aluminum-salt-stabilized silica to determine how much fluoride can bind with the aluminum stabilizer present.

To a 500 ml beaker, 157.4 g of de-ionized water was added, this solution was kept under agitation using a magnetic stirrer. To the de-ionized water, 12.6 g of the aluminum acetate modified silica slurry prepared as described above (~30 weight percent silica) was added under agitation, and mixed for additional 5 minutes. This ~2% dispersion, having a mass of 170 g, had pH of 3.6, and zeta potential of the silica was +83.4 as measured using ACCUSTOSIZER® instrument. The slurry contained about 3.7 grams of silica having thereon about 30 E-4 moles of aluminum mono-acetate and 9.6 E-4 moles of boric acid coated on the silica as stabilizers. Under agitation, ammonium fluoride solution (10 weight percent) was added to the aluminum acetate modified silica dispersion at a rate of 0.33 ml/min. During the addition of ammonium fluoride solution, the pH and the zeta potential of the aluminum acetate modified silica was continuously measured using COLLODIAL DYNAMICS® instrument. The data is shown in Table 1 and in FIG. 3. The data show a reversal of zeta potential from (positive) +83 mV to a negative value suggesting the removal of acetate group and substitution with fluoride group as shown in FIG. 3.

Figure 3:
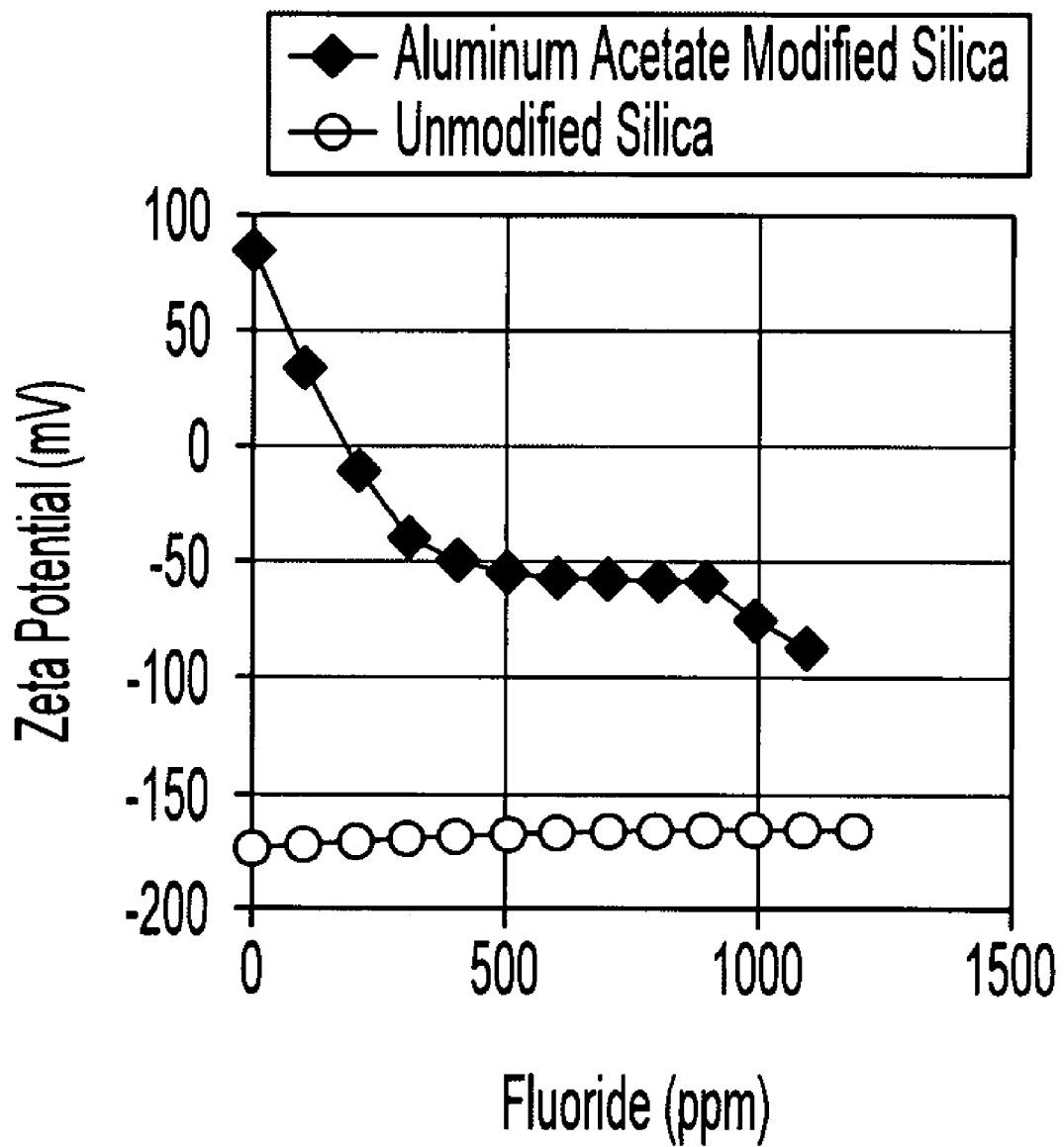
FIG. 3 shows a graph comparing the changes in zeta potential (mV) with increasing fluoride concentration (ppm) for aluminum acetate modified silica and unmodified silica.

Looking at FIG. 3, it appears that the zeta potential of the stabilized silica stopped changing after about 350 ppm of fluoride was added (this amount is calculated from extrapolating the curves before and after the transition, as the transition point in a titration is never a sharp change due to kinetic effects). At the 350 ppm point about 0.117 grams of ammonium fluoride or about 32 E-4 moles of fluoride added. As previously mentioned the 3.7 grams of silica was believed to contain about 30 E-4 moles of aluminum mono-acetate and 9.6 E-4 moles of boric acid coated on the silica as stabilizers. The data suggests that the fluoride is attaching to the aluminum-containing stabilizer, and if the fluoride is attaching to the boric acid stabilizer it is doing so in only a minor amount.

FIG. 3 shows a comparison of Zeta Potential Changes, Reaction of Ammonium Fluoride with Aluminum Acetate Modified Silica, and Unmodified Silica. From the plotted titration curve of measured zeta potential as a function of amount of ammonium fluoride added to a given amount of silica during surface modification, the percentage of surface coverage of the available aluminum on the surface of the surface-modified colloidal silica particles with fluoride was determined to be approximately about 100% (99.9%). The last two data points also suggest that when there was excess F that some additional F began to adhere to the silica, perhaps as fluoride ionically bound to aluminum-containing stabilizer.

TABLE 1

Reaction of Ammonium Fluoride with Aluminum Acetate Modified Silica, Zeta Potential as a Function of Ammonium Fluoride Concentration

| Titrant Volume Added (ml) | Ammonium Fluoride Added (g) | Fluoride (ppm) | Sample Volume (ml) | Zeta Potential (mV) | pH |
|---|---|---|---|---|---|
| 0 | 0 | 0 | 170.0 | 83.4 | 3.6 |
| 0.33 | 0.033 | 100 | 170.3 | 33.1 | 4.8 |
| 0.67 | 0.067 | 202 | 170.7 | −11.3 | 5.8 |
| 1.00 | 0.100 | 301 | 171.0 | −40.6 | 6.5 |
| 1.33 | 0.133 | 400 | 171.3 | −50.0 | 6.9 |
| 1.67 | 0.167 | 501 | 171.7 | −54.6 | 7.2 |
| 2.00 | 0.201 | 599 | 172.0 | −57.1 | 7.3 |
| 2.33 | 0.234 | 697 | 172.3 | −57.8 | 7.4 |
| 2.67 | 0.268 | 797 | 172.7 | −58.8 | 7.5 |
| 3.00 | 0.301 | 894 | 173.0 | −59.1 | 7.6 |
| 3.33 | 0.334 | 990 | 173.3 | −76.0 | 7.7 |
| 3.67 | 0.368 | 1089 | 173.7 | −87.6 | 7.7 |

Comparative Example 1

Control Experiment; Reaction of Unmodified Silica with Ammonium Fluoride

In a control experiments, under identical reaction conditions, SYTON® HT50, was titrated with ammonium fluoride (2.0 weight percent solution). This data is plotted in FIG. 3 and this data is also shown in Table 2. Clearly addition of ammonium fluoride did not change zeta potential of unmodified silica, SYTON® HT50, suggesting no reaction between ammonium fluoride and sodium ion stabilized silica in the absence of the aluminum-containing stabilizer or aluminum-containing and borate-containing stabilizers.

TABLE 2

Control Experiment; Reaction of Ammonium Fluoride with Unmodified Silica, Zeta-Potential as a Function of Ammonium Fluoride Concentration.

| Titrant Volume Added (ml) | Ammonium Fluoride Added (g) | Fluoride (ppm) | Sample Volume (ml) | Zeta Potential (mV) | pH |
|---|---|---|---|---|---|
| 0 | 0 | 0 | 170.0 | −174.5 | 8.8 |
| 0.33 | 0.033 | 100 | 170.3 | −172.2 | 8.8 |
| 0.67 | 0.067 | 202 | 170.7 | −170.9 | 8.7 |
| 1.00 | 0.100 | 301 | 171.0 | −169.7 | 8.7 |
| 1.33 | 0.133 | 400 | 171.3 | −168.8 | 8.7 |
| 1.67 | 0.167 | 501 | 171.7 | −168.0 | 8.7 |
| 2.00 | 0.201 | 599 | 172.0 | −167.4 | 8.6 |
| 2.33 | 0.234 | 697 | 172.3 | −166.6 | 8.6 |
| 2.67 | 0.268 | 797 | 172.7 | −166.7 | 8.6 |
| 3.00 | 0.301 | 894 | 173.0 | −166.3 | 8.6 |
| 3.33 | 0.334 | 990 | 173.3 | −166.9 | 8.6 |
| 3.67 | 0.368 | 1089 | 173.7 | −166.8 | 8.6 |
| 4.00 | 0.401 | 1185 | 174 | −166.5 | 8.6 |

Example 2

In this example the preparation of boric acid/aluminum fluoride modified silica from the reaction between aluminum acetate modified silica and hydrofluoric acid as opposed to reacting with ammonium fluoride is shown.

For the preparation of aluminum fluoride modified silica from aluminum acetate modified silica using hydrofluoric acid, the first and second procedural steps were repeated as described in Example 1, however in step 2 of Example 2, ammonium fluoride was replaced with hydrofluoric acid. In this case as in Example 1 the initial zeta potential was positive and upon addition of fluoride the zeta potential became negative, but the pH of the slurry remained low at about 4.1. In Table 3, the properties of aluminum fluoride surface modified silica, aluminum acetate surface modified silica, and sodium ion stabilized silica are each summarized.

TABLE 3

Zeta potential, Particle Size Distribution, and Dispersion Stability Aluminum Fluoride Modified Colloidal Silica.

| | Comparative Example 1-A: Boric acid/Al acetate modified colloidal silica | Example 1: Boric acid/Al acetate/fluoride (from NH3F) modified colloidal silica, pH adjusted with nitric acid | Example 2: Same as Example 1, but the fluoride source was hydrofluoric acid | Example 8: Unmodified silica pH adjusted to acidic |
|---|---|---|---|---|
| Zeta potential | (Positive) +45 mV | (Negative) −32 mV | (Negative) −55.2 | (Negative) −72.2 |
| Silica (weight percent) | 1.12 | 1.12 | 1.12 | 1.12 |
| Particle size D15/D50/D85 (nm) | 23/49/230 | 16/45/279 | Not measured | Not measured |
| pH | 5.2* | 4.1 | 4.1 | 4.1 |
| Stability | Stable dispersion | Stable dispersion | Stable dispersion | Settled |

*Native pH of aluminum acetate modified silica

Untreated unmodified colloidal silica of this size has a zeta potential of about minus 170 mV in a basic slurry and minus 72 in an acidic (pH 4.1) slurry. As data suggest, silica having most of its available surface area modified with aluminum acetate exhibits a positive zeta potential, e.g., +45 mV. The positive charge is believed due in some part to protonated acetate groups, though boric acid stabilizer (which also raises the zeta potential) was probably also present. The value of the zeta potential value is dependent on a number of variables including upon weight percent solids during zeta potential measurement, so the amount of solids was kept constant at 1.12% for all data shown in Table 3. For the further modification of aluminum-modified silica with ammonium fluoride (again having most of the available surface covered by ammonium fluoride), such as prepared in Example 1, the zeta potential changed from positive to negative, e.g., from +45 mV to −32 mV. This is expected from the reaction of fluoride with aluminum acetate surface modified silica to produce aluminum fluoride surface modified silica. The same change was observed when hydrogen fluoride was used, as in Example 2, but the magnitude of the zeta potential change was lower, e.g., from +45 mV to −16.3 mV at pH 4.1. Again, there is no apparent reaction of ammonium fluoride with sodium stabilized silica as the zeta potential did not change, and the acidic composition (at pH 4.1) of unmodified silica produced as expected an unstable colloidal particle.

There may be some slight loss of stability when fluoride is added to the surface-modifying stabilizer, as suggested by the slight increase in the D85 particle size, but this loss of stability is not great enough to result in settling.

Example 3

Polishing CMP Tools, Blanket Wafers, and Metrology

In the example and comparative example presented below, CMP experiments were run using the procedures and experimental conditions given below. An IPEC-SpeedFam Avanti 472 (manufactured by SpeedFam IPEC, 305 North 54th Street, Chandler, Ariz. 85226) CMP tool was used for the polishing. Polish conditions for the blanket wafer polishing studies in Examples 3 and 4 were: 60 second polish time per wafer; down force 7 psi; back pressure 0 psi; table speed 70 rpm; head speed 75 rpm; slurry flow 175 ml/min; using a pre-conditioned IC1400 pad supplied by Rohm and Haas Electronic Materials. The polishing compositions were used to polish CVD tungsten blanket wafers, titanium blanket-wafers, and PETEOS dielectric blanket wafers. The blanket wafers were purchased from Silicon Valley Microelectronics, 1150 Campbell Ave, CA 95126. The PETEOS wafers had a film thickness specification of 15,000 Å PETEOS. The CVD tungsten wafers had film stack thickness specifications of 8000 Å CVD tungsten/250 Å titanium/6300 Å thermal oxide. PETEOS film thickness was measured with a Nanometrics, model #9200, manufactured by Nanometrics Inc, 1550 Buckeye, Milpitas, Calif. 95035-7418. Metal film thickness was measured with a ResMap CDE Model 168 four-point probe sheet resistance tool, manufactured by Creative Design Engineering, Inc, 20565 Alves Dr, Cupertino, Calif., 95014. This tool is a four-point probe sheet resistance tool. Twenty-five and forty nine-point polar scans were taken with the respective tools.

For Comparative Example 3-C, about 4 Kg of a formulated polishing slurry formulation was prepared using the following components: 1) 154 grams of aluminum acetate modified colloidal silica as from Example 1 (first step), 30% solids, positive sol; 2) about 2.8 grams of SURFYNOL® 104E; 3) 346 grams of periodic acid (30%), and a balance of water. In a 5-liter beaker, 2.8 grams of SURFYNOL® 104 E was added to 3300 g of deionized water (S—$H_2O$) and the contents of the mixture were stirred using a magnetic stirrer. Under agitation, 154 g of aluminum acetate modified colloidal silica slurry was added slowly during a period of 5 minutes, and then 346 g of 30% periodic acid was added during a period of 40 minutes. The pH of the composition dropped during the addition of the periodic acid to a value between to 2.4 and 2.7. After completing the addition of periodic acid, 200 ml of de-ionized water was added to produce 4 kg of the formulated slurry.

This comparative slurry was then used for polishing the blanket wafers under the conditions described. In Table 4, polishing conditions, tungsten removal rates, titanium removal rates, PETEOS removal rates, and tungsten-to-PETEOS selectivity are summarized.

For Example 3, a similar slurry was made using aluminum fluoride modified silica similar to that resulting from Example 1. This 4 kg of slurry included 1) 154 grams of 30% solids aluminum fluoride modified colloidal silica slurry from Example 1; 2) 2.8 grams of SURFYNOL® 104E; 3) 346 grams periodic acid (30%); and 4) balance water. The silica is believed to be surface-modified with about 0.014 grams of fluoride per gram of silica, but the added slurry contained several times this amount, some of which may be ionically bound to the aluminum-containing stabilizer. The polishing slurry was prepared using a procedure identical to that described for comparative slurry 3-C. This slurry was then used for polishing the blanket wafers under the conditions described. In Table 4, polishing conditions, tungsten removal rates, titanium removal rates, PETEOS removal rates, and tungsten-to-PETEOS selectivity measured when using the slurry of Example 3 are summarized.

TABLE 4

Aluminum Fluoride Modified Colloidal Silica Used in the Chemical Mechanical Planarization of Substrates.

|  | Comp. Example 3-C: Aluminum acetate modified silica | Example 3: Aluminum fluoride modified silica |
|---|---|---|
| pH | 4.37 | 4.4 |
| Zeta potential | (Positive) +45 mV | (Negative) −32 mV |
| Periodic acid | ~2.6% | ~2.6% |
| SURFYNOL ® 104E | ~0.07% | ~0.07% |
| Silica (at 30% wt silica) | ~1.15% | ~1.15% |
| Fluoride (as $F^-$, bound/total) | 0 | ~0.002%/<~0.008% |
| Tungsten Removal Rate (Å/min) | 3160 | 5300 |
| PETEOS Removal Rate (Å/min) | 645 | 635 |
| Titanium Removal Rate (Å/min) | 1220 | 1500 |
| Tungsten-to-PETEOS Selectivity:Ratio | ~4.8 | ~8.3 |
| Tungsten-to-Titanium Selectivity Ratio | ~2.6 | ~3.5 |
| Titanium-to-PETEOS Selectivity:Ratio | ~1.9 | ~2.3 |

The polishing data show a 67% increase in the polishing rate of tungsten using aluminum fluoride surface modified colloidal silica compared to using aluminum acetate surface modified colloidal silica. Such an increase, when all other polishing conditions were the same, was surprisingly high in view of the trace of fluoride present. Commercially attractive tungsten polishing rates using normal polishing conditions are over 4000 angstroms per minute or greater, and are preferably over 5000 angstroms per minute. The prior art systems have been able to achieve this rate only if adding iron catalysts, which create a metal ion contamination of the substrate issue, or by adding greater amounts of soluble fluoride ions which cause undesirable attack on the various substrates. There was also a significant (~23%) increase in the titanium removal rate, while the PETEOS removal rate was not affected by the fluoride.

Another benefit was that the aluminum fluoride surface modified silica increased the tungsten-to-PETEOS selectivity from 4.8 to 8.3, and tungsten-to-titanium selectivity from 2.6 to 3.5. Such increased selectivity is beneficial for most CMP formulations as it allows rapid identification of the endpoint of polishing (that is, when the dielectric appears on the surface and the substrate removal rate drops significantly. Advantageously, the tungsten to dielectric selectivity is at least 6 to 1, for example, at least 8 to 1, or, for example, between 6:1 and 15:1. Advantageously, the tungsten to titanium selectivity is at least 3 to 1, for example, or, for example, between 3:1 and 5:1. Advantageously, the tungsten to titanium nitride selectivity is at least 3 to 1, for example, between 3:1 and 5:1.

The present invention has been set forth with regard to several preferred embodiments. The invention is not intended to be limited by the Examples, which are included rather to show how the material can be manufactured and representative data showing improved polishing characteristics. The present invention's full scope should not be limited to the disclosure of those embodiments, but rather the full scope of the present invention should be ascertained from the claims that follow.

What is claimed is:

1. A chemical-mechanical planarization composition comprising: surface-modified abrasive particles having at least a portion of the surface thereof modified with aluminum-containing stabilizer and with fluoride, wherein the moles of surface-modifying fluoride present is between 0.01 and 3 times the moles of surface-modifying aluminum-containing stabilizer disposed on the surface of abrasive particles.

2. The composition of claim 1 wherein the amount of aluminum-containing stabilizer is between $0.1 \times 10^{-4}$ moles and $25 \times 10^{-4}$ moles per gram of surface-modified abrasive.

3. The composition of claim 2 wherein the composition comprises the abrasive having the surface-modifying fluoride, and further comprises soluble fluoride, wherein the total amount of surface-modifying fluoride and soluble fluoride in the composition is such that at least one tenth of the fluoride is surface-modifying fluoride associated with abrasive particles having aluminum-containing stabilizer thereon.

4. The composition of claim 2 wherein the total moles of surface-modifying fluoride present in the composition is equal to or less than 8 times the moles of aluminum-containing stabilizer disposed on the surface of abrasive particles.

5. The composition of claim 2 wherein the total moles of surface-modifying fluoride present in the composition is equal to or less than 5 times the moles of aluminum-containing stabilizer disposed on the surface of abrasive particles.

6. The composition of claim 2 wherein the total moles of surface-modifying fluoride present in the composition is equal to or less than 4 times the moles of aluminum-containing stabilizer disposed on the surface of abrasive particles.

7. The composition of claim 1 wherein the surface-modified abrasive particles are colloidal silica.

8. The composition of claim 7 wherein the amount of aluminum-containing stabilizer is between $0.1 \times 10^{-4}$ moles and $25 \times 10^{-4}$ moles per gram of surface-modified abrasive.

9. The composition of claim 7 wherein the composition comprises the abrasive having the surface-modifying fluoride, and further comprises soluble fluoride, wherein the total amount of surface-modifying fluoride and soluble fluoride in the composition is such that at least one tenth of the fluoride is surface-modifying fluoride associated with abrasive particles having aluminum-containing stabilizer thereon.

10. The composition of claim 8 wherein the total moles of surface-modifying fluoride present in the composition is equal to or less than 8 times the moles of aluminum-containing stabilizer disposed on the surface of abrasive particles.

11. The composition of claim 8 wherein the total moles of surface-modifying fluoride present in the composition is equal to or less than 4 times the moles of aluminum-containing stabilizer disposed on the surface of abrasive particles.

12. The composition of claim 1 wherein the surface-modified abrasive is silica, wherein amount of aluminum-containing stabilizer is between $2 \times 10.4$ and $15 \times 10.4$ moles per gram of silica.

13. The composition of claim 1 wherein the surface-modified abrasive further comprises a second stabilizer selected from boric acid, borate, or mixture thereof.

14. A method of chemical mechanical polishing a substrate comprising tungsten, said method comprising: movably contacting a substrate having tungsten on a surface thereof with an aqueous composition comprising the composition of claim 1.

15. The composition of claim 1 wherein the moles of fluoride is between about 0.5 to about 2 times the moles of aluminum-containing stabilizer added to the abrasive particles.

16. The composition of claim 8 wherein the moles of fluoride is between about 0.5 to about 2 times the moles of aluminum-containing stabilizer added to the abrasive particles.

17. The method of claim 14 wherein the amount of aluminum-containing stabilizer is between $0.1 \times 10^{-4}$ moles and $25 \times 10^{-4}$ moles per gram of surface-modified abrasive.

18. The method of claim 17 wherein the composition comprises the abrasive having the surface-modifying fluoride, and further comprises soluble fluoride, wherein the total amount of surface-modifying fluoride and soluble fluoride in the composition is such that at least one tenth of the fluoride is surface-modifying fluoride associated with abrasive particles having aluminum-containing stabilizer thereon.

19. The method of claim 17 wherein the total moles of surface-modifying fluoride present in the composition is equal to or less than 5 times the moles of aluminum-containing stabilizer disposed on the surface of abrasive particles.

* * * * *

UNITED STATES PATENT AND TRADEMARK OFFICE
CERTIFICATE OF CORRECTION

PATENT NO. : 8,163,049 B2
APPLICATION NO. : 11/783191
DATED : April 24, 2012
INVENTOR(S) : Junaid Ahmed Siddiqui It is certified that error appears in the above-identified patent and that said Letters Patent is hereby corrected as shown below:

Column 22, Line 24

In claim 12, delete "10.4 and 15 times 10.4 moles" and insert -- $10^{-4}$ and 15 times $10^{-4}$ moles --

Signed and Sealed this
Ninth Day of April, 2013

Teresa Stanek Rea
*Acting Director of the United States Patent and Trademark Office*